United States Patent
Hargreaves et al.

(10) Patent No.: US 9,417,738 B2
(45) Date of Patent: Aug. 16, 2016

(54) UNTETHERED ACTIVE PEN AND A METHOD FOR COMMUNICATING WITH A CAPACITIVE SENSING DEVICE USING THE UNTETHERED ACTIVE PEN

(75) Inventors: Kirk Hargreaves, Mountain View, CA (US); Joseph Kurth Reynolds, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 2083 days.

(21) Appl. No.: 12/484,042

(22) Filed: Jun. 12, 2009

(65) Prior Publication Data

US 2010/0315384 A1 Dec. 16, 2010

(51) Int. Cl.
*G06F 3/044* (2006.01)
*G06F 3/0354* (2013.01)

(52) U.S. Cl.
CPC ............ *G06F 3/044* (2013.01); *G06F 3/03545* (2013.01); *G09G 2310/0235* (2013.01); *G09G 2360/14* (2013.01)

(58) Field of Classification Search
CPC .............................. G06F 3/044; G06F 3/03545
USPC ............................... 345/179; 178/19.01, 19.03
See application file for complete search history.

(56) References Cited

U.S. PATENT DOCUMENTS

| | | | | |
|---|---|---|---|---|
| 5,124,509 A * | 6/1992 | Hoendervoogt | ........ | G06F 3/041 178/18.06 |
| 5,251,123 A * | 10/1993 | Reiffel et al. | .................. | 700/56 |
| 5,528,002 A * | 6/1996 | Katabami | ........... | G06F 3/03545 178/19.06 |
| 5,672,852 A * | 9/1997 | Fukuzaki | ................ | G06F 3/046 178/18.07 |
| 5,679,930 A * | 10/1997 | Katsurahira | ............ | G06F 3/041 178/19.06 |
| 5,889,237 A * | 3/1999 | Makinwa | ............ | G06F 3/03545 178/18.01 |
| 6,744,726 B1 | 6/2004 | Minami | | |
| 7,292,229 B2 | 11/2007 | Morag et al. | | |
| 7,474,300 B2 | 1/2009 | Katsurahira et al. | | |
| 7,612,767 B1 * | 11/2009 | Griffin | .................... | G06F 3/044 178/19.03 |
| 8,089,474 B2 | 1/2012 | Geaghan et al. | | |
| 8,094,133 B2 | 1/2012 | Sato et al. | | |
| 8,766,954 B2 | 7/2014 | Vuppu et al. | | |
| 2004/0095333 A1 * | 5/2004 | Morag | ................ | G06F 3/03545 345/173 |
| 2005/0128191 A1 * | 6/2005 | Katsurahira | .......... | G06F 1/3203 345/179 |
| 2005/0162398 A1 | 7/2005 | Eliasson et al. | | |
| 2006/0227116 A1 | 10/2006 | Zotov et al. | | |
| 2008/0128180 A1 * | 6/2008 | Perski | ..................... | G06F 3/046 178/18.03 |
| 2008/0156546 A1 * | 7/2008 | Hauck | ................ | G06F 3/03545 178/19.01 |
| 2008/0158165 A1 * | 7/2008 | Geaghan | ............. | G06F 3/03545 345/173 |
| 2010/0066693 A1 * | 3/2010 | Sato | ........................ | G06F 3/044 345/173 |
| 2010/0085325 A1 * | 4/2010 | King-Smith | ........ | G06F 3/03545 345/174 |
| 2011/0122087 A1 * | 5/2011 | Jang | ........................ | G06F 3/044 345/174 |
| 2011/0155479 A1 * | 6/2011 | Oda | ..................... | G06F 3/03545 178/18.06 |
| 2012/0062521 A1 * | 3/2012 | Ahn | ..................... | G06F 3/03545 345/179 |
| 2012/0154340 A1 * | 6/2012 | Vuppu | ..................... | G06F 3/044 345/179 |

* cited by examiner

*Primary Examiner* — Matthew Fry

(57) ABSTRACT

A method for communicating with a capacitive sensing device using an untethered active pen. The method includes capacitively receiving a capacitive sensing signal at a capacitive receiving unit of the untethered active pen. The capacitive sensing signal is output from the capacitive sensing device. In addition, the method includes determining a first frequency and a first phase associated with the capacitive sensing signal. Moreover, the method includes transmitting at a second frequency and a second phase an amplified active pen signal at the capacitive sensing device from the untethered active pen. The amplified active pen signal has a second frequency and a second phase that correspond to the first frequency and the first phase.

22 Claims, 7 Drawing Sheets

US 9,417,738 B2

UNTETHERED ACTIVE PEN AND A METHOD FOR COMMUNICATING WITH A CAPACITIVE SENSING DEVICE USING THE UNTETHERED ACTIVE PEN

BACKGROUND

With the spectacular rise of personal computer and telecommunications technology, there has been an equally phenomenal development in the technology of human machine interfaces. Most notable among these has been the development of the graphical user interface (GUI), which allows the user to input data into a computer system simply by pointing and clicking with a pointing device such as a computer mouse. This has lead scientists and engineers engaged in the field of human machine interfaces to develop alternative technologies for pointing devices, for example, capacitive sensing devices such as touchpads and touch screens, which are ubiquitously present as input devices for laptop computers and mobile phones.

Thus, with the growth of capacitive sensing devices utilized as human machine interfaces, alternative methods of interacting with such capacitive sensing devices such as by means of a pen, a term of art for a stylus used to input information into a capacitive sensing device, have attracted continuing attention from the scientific and engineering community engaged in the field of human machine interfaces.

BRIEF DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale unless specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, circuits, and components have not been described in detail as not to unnecessarily obscure embodiments of the present invention.

Figure 1A:
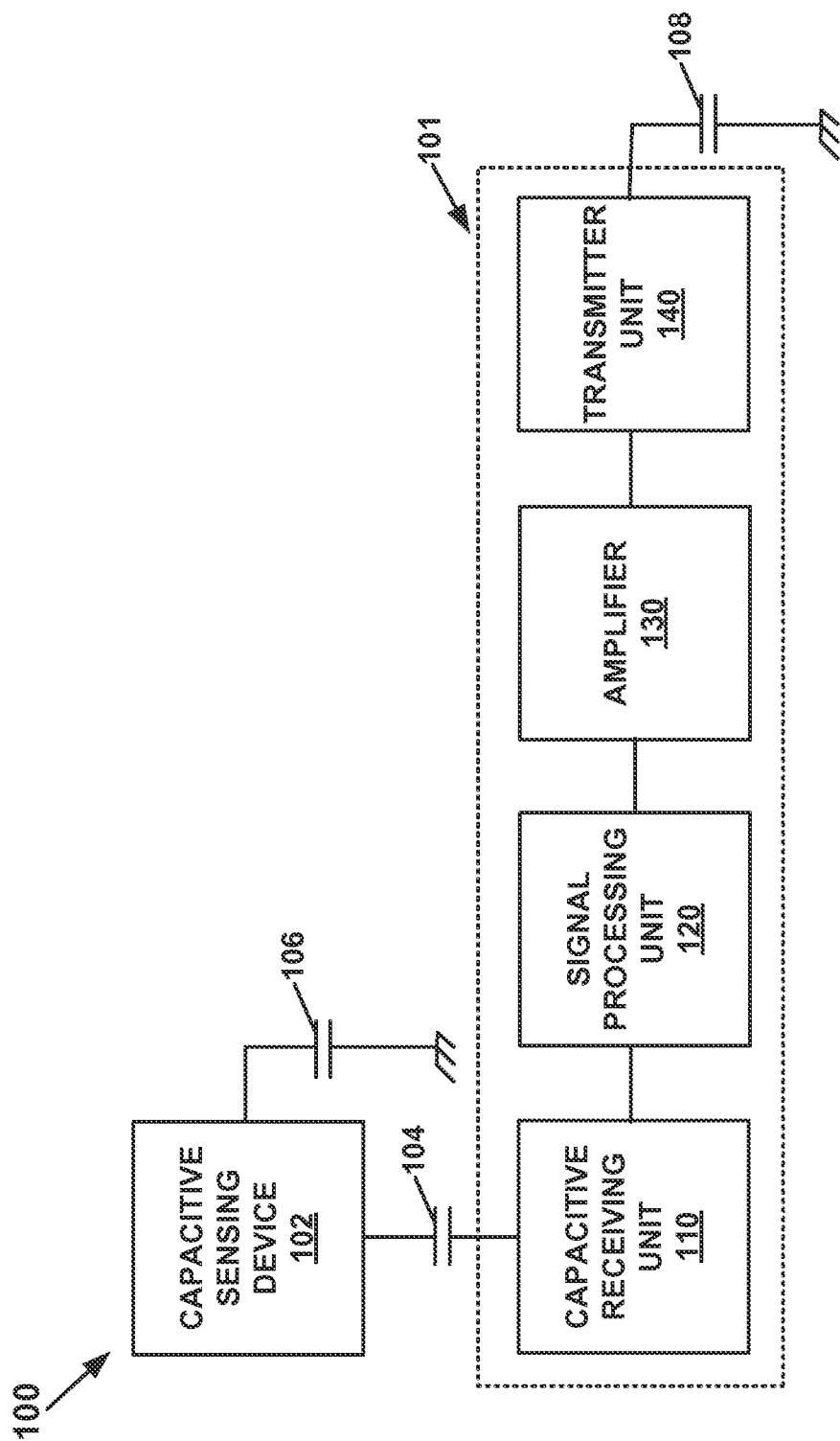
FIG. 1A is a block diagram illustrating component blocks of an untethered active pen for communicating with a capacitive sensing device, in an embodiment of the present invention.

Example Untethered Active Pen for Communicating With a Capacitive Sensing Device With reference now to FIG. 1A, in accordance with an embodiment of the present invention, a block diagram 100 is shown. Block diagram 100 illustrates the arrangement of the component blocks of an untethered active pen 101 for communicating with a capacitive sensing device 102. In embodiments of the present invention, capacitive sensing device 102 may be any of a touchpad, a touch screen, or capacitive input device, without limitation thereto, as may be commonly used for laptop computers or other personal communication devices. In one embodiment, capacitive sensing device 102 is designed to accept input from a user's finger to mimic the behavior of a pointing input device such as a computer mouse, as may be used for input interactions with a graphical user interface (GUI). However, embodiments of the present invention have been found useful to input information into capacitive sensing device 102 by other means, such as an untethered active pen 101.

The signal received by the capacitive sensing device from an input object, such as a user's finger or a pen tip, is roughly proportional to the capacitance determined by the contact area of the input object with the capacitive sensing device. Typically, a finger interacting with a capacitive sensing device, such as, for example, capacitive sensing device 102, will have a contact patch/area in the range of 5 mm to 11 mm in diameter. A contact patch within this range provides enough capacitive coupling between the finger and the capacitive sensing device to allow the finger to be properly located and tracked by the capacitive sensing device. In some instances, a contact patch/area smaller than 3 mm in diameter is unable to provide enough capacitive coupling between the input object and the capacitive sensing device for the capacitive sensing device to properly locate and track the input object.

In one embodiment, the pen tip of an untethered active pen 101 has a contact area smaller than 3 mm in diameter, making the pen tip in and of itself difficult to detect by capacitive sensing device 102. However, the following embodiments describing untethered active pen 101 allow for the pen tip to appear as if it has a much larger coupling capacitance, even though an unenhanced coupling capacitance of the pen tip of untethered active pen 101 is much lower than the coupling capacitance of a user's finger.

To enhance the interaction of a pen tip of untethered active pen 101 with capacitive sensing device 102, embodiments of the present invention increase the signal sensed by capacitive sensing device 102 by transmitting an amplified active pen signal from untethered active pen 101. In other embodiments, the average strength of the amplified active pen signal can also be varied. The amplified active pen signal has an amplitude sufficient to emulate the capacitive coupling between a user's finger and capacitive sensing device 102. In other embodiments, an average power of the amplified active pen signal is varied to emulate the capacitive coupling between a user's finger and capacitive sensing device 102. A user's finger typically has a coupling capacitance equal to about 1 picofarad (pF), and pen tip of untethered active pen 101 has a coupling capacitance equal to about 10 femtofarad (fF). Therefore, in one embodiment, by transmitting an amplified active pen signal from untethered active pen 101, with sufficient amplitude, untethered active pen 101 can be made to emulate the way in which a user's finger interacts with capacitive sensing device 102. In another embodiment, by transmitting an amplified active pen signal from untethered active pen 101, with sufficient average power, untethered active pen 101 can be made to emulate the way in which a user's finger interacts with capacitive sensing device 102. The component blocks in block diagram 100 of untethered active pen 101, which are arranged to provide the amplified active pen signal, are next described.

With further reference to FIG. 1A, in accordance with an embodiment, untethered active pen 101 includes a capacitive receiving unit 110. Capacitive receiving unit 110 capacitively receives a capacitive sensing signal from capacitive sensing device 102. However, embodiments are not limited to capacitively receiving a capacitive sensing signal from a capacitive sensing device 102. For example, in some embodiments, the capacitive sensing signal is received from other sending devices more generally. For example, in various embodiments, the capacitive sensing signal is received from an infrared (IR) light-emitting diode (LED) or an inductive sending device, without limitation thereto, as is subsequently described. In particular, the information related to the capacitive sensing signal may be embedded within another signal. For example, in one embodiment, an IR signal from an IR LED, which is used to communicate with an untethered active pen, transmits frequency and phase information of the capacitive sensing signal without transmitting the capacitive sensing signal itself. Moreover, the embodiments which are next described, as applied to untethered active pen 101, describe how untethered active pen 101 can capacitively receive the capacitive sensing signal from capacitive sensing device 102. It is appreciated that these embodiments may also be germane to other sending devices, several example embodiments of which are described herein.

With further reference to FIG. 1A, in accordance with an embodiment, capacitive receiving unit 110 is coupled to capacitive sensing device 102 through a coupling capacitance 104 of a pen tip 202 of capacitive receiving unit 110. As used herein, the coupling capacitance of pen tip 202 is to be understood as the coupling capacitance between pen tip 202 and capacitive sensing device 102. Thus, capacitive receiving unit 110 may receive the capacitive sensing signal from capacitive sensing device 102.

In some embodiments, untethered active pen 101 also includes a signal processing unit 120. In one embodiment, processing unit 120 determines a first frequency and a first phase associated with the capacitive sensing signal. In another embodiment, processing unit 120 determines a first frequency, a first phase and the signal strength associated with the capacitive sensing signal. In some embodiments, processing unit 120 also generates an active pen signal with a second frequency and a second phase corresponding to the first frequency and the first phase. In other embodiments, processing unit 120 also generates an active pen signal with a second frequency, a second phase and an average power corresponding to the first frequency, the first phase and first signal strength. In one embodiment, determining the average power can include determining the number of cycles to transmit the active pen signal. The first frequency and the first phase associated with the capacitive sensing signal may be, for example, a frequency and a phase of a capacitive sensing signal that is generated by the capacitive sensing device 102 to detect an input object. Such a capacitive sensing signal is well known in the art. In some embodiments, signal processing unit 120 determines the second frequency and the second phase corresponding to the first frequency and the first phase.

Figure 1B:
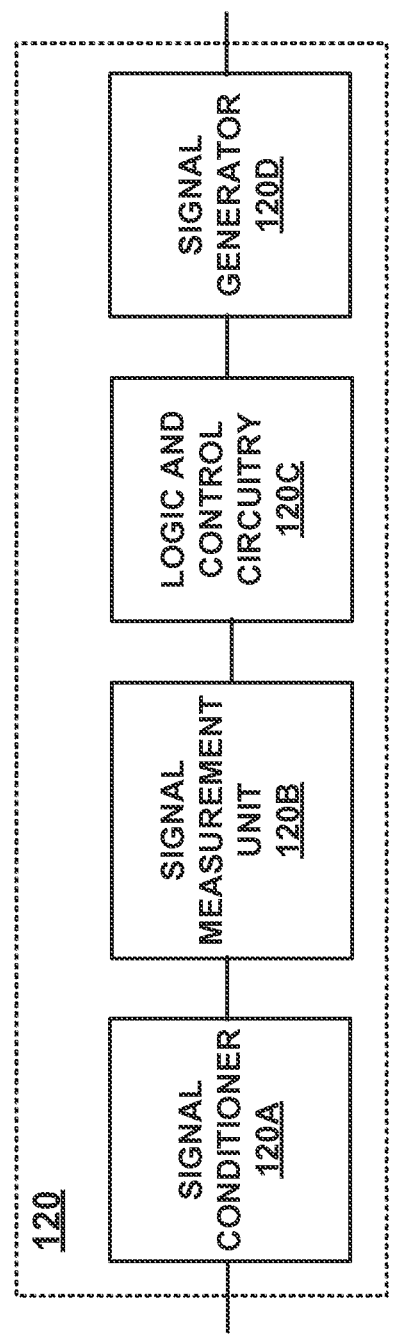
FIG. 1B is a block diagram illustrating component blocks within a signal processing unit of the untethered active pen of FIG. 1A, in an embodiment of the present invention.

With reference now to FIG. 1B, in accordance with an embodiment of the present invention, signal processing unit 120 may include signal conditioner 120A, signal measurement unit 120B, logic and control circuitry block 120C and signal generator 120D. Signal conditioner 120A may include a bandpass filter to filter the received capacitive sensing signal. Signal measurement unit 120B, in one embodiment, includes a signal strength measurement unit and a comparator. In another embodiment, signal measurement unit 120B includes a comparator. Logic and control circuitry block 120C includes logic and control circuitry, for example, similar to logic and control circuitry 228 as shown in FIG. 2B, that enables signal processing unit 120 to determine the parameters of the received capacitive sensing signal. Signal generator 120D generates the signal to be transmitted from the untethered active pen.

In some embodiments, untethered active pen 101 also includes an amplifier 130. Amplifier 130 amplifies the active pen signal generated by signal processing unit 120. By such amplification, amplifier 130 produces an amplified active pen signal.

In some embodiments, untethered active pen 101 also includes a transmitter unit 140. Transmitter unit 140 transmits the amplified active pen signal at capacitive sensing device 102 from untethered active pen 101. In one embodiment, transmitter unit 140 transmits the amplified active pen signal at capacitive sensing device 102 from untethered active pen 101 with an average power corresponding to the first signal strength. In another embodiment, transmitter unit 140 transmits the amplified active pen signal at capacitive sensing device 102 from untethered active pen 101 for a determined number of cycles. In some embodiments of the present invention, a capacitance 106 between capacitive sensing device 102 and earth ground, and an external impedance 108, shown by way of example without limitation thereto as a capacitance, between untethered active pen 101 and earth ground provide a closed alternating current (AC) circuit. Via this closed AC circuit, untethered active pen 101 is capacitively coupled to capacitive sensing device 102 through coupling capacitance 104. Through this closed AC circuit, the amplified active pen signal is transmitted to capacitive sensing device 102. In embodiments of the present invention, the amplified active pen signal has a second frequency and a second phase, which correspond, respectively, to the first frequency and the first phase of the capacitive sensing signal.

Figure 2A:
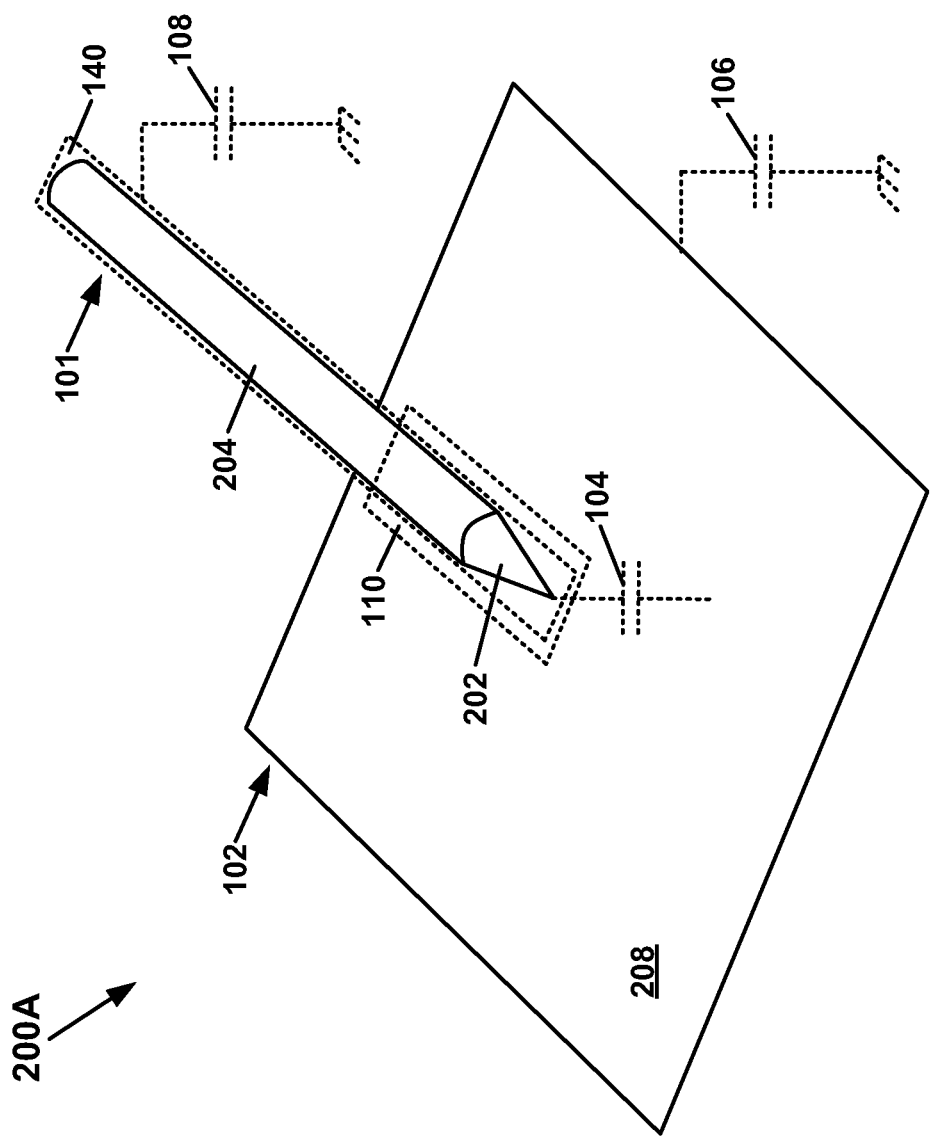
FIG. 2A is a schematic diagram illustrating an arrangement of a pen tip of the untethered active pen within the component blocks for the untethered active pen of FIG. 1A, in an embodiment of the present invention.
Figure 2B:
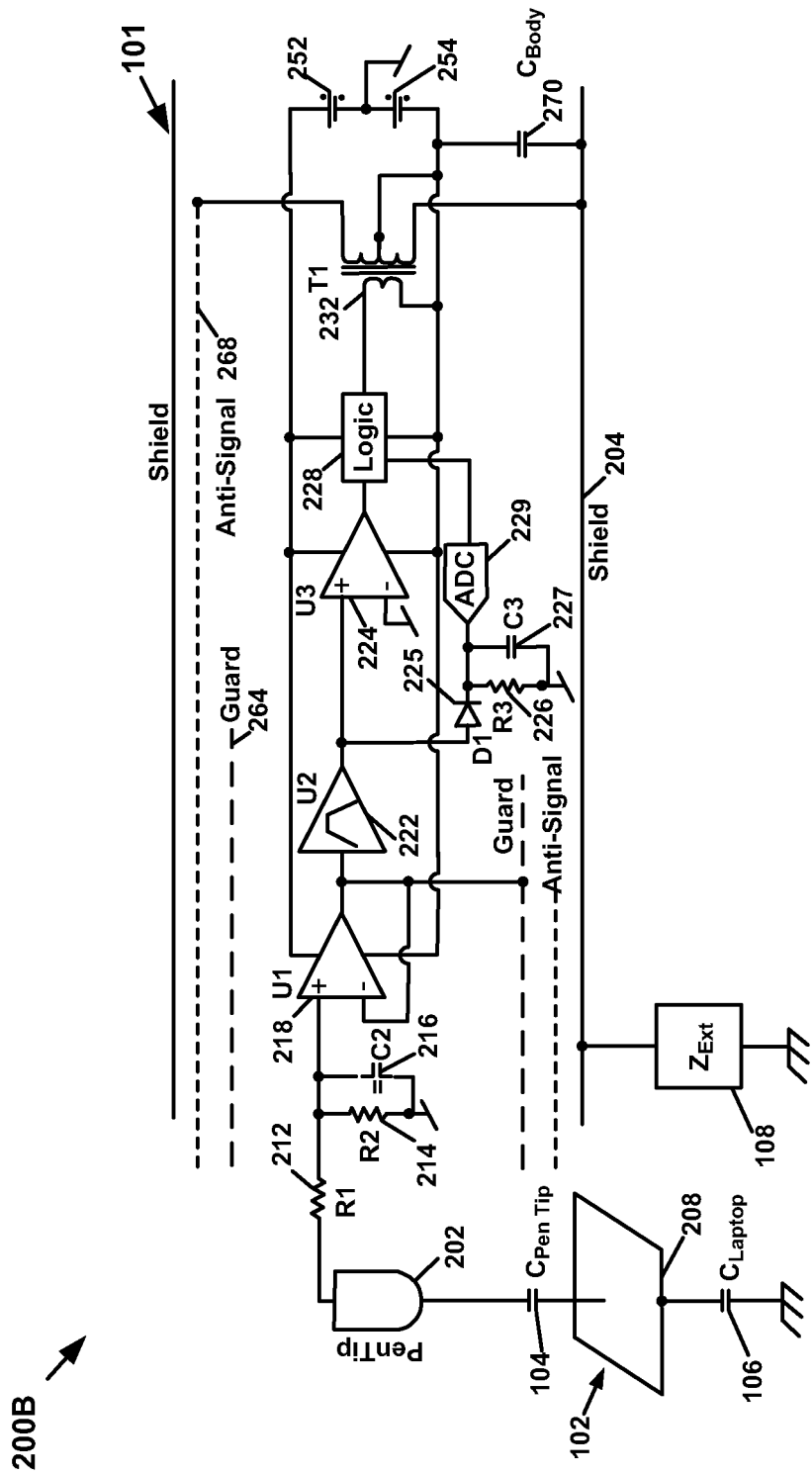
FIG. 2B is a circuit diagram illustrating an arrangement of electronic components within the component blocks for the untethered active pen of FIG. 1A, in an embodiment of the present invention.

With reference now to FIG. 2A, in accordance with an embodiment of the present invention, a schematic diagram 200A of untethered active pen 101 is shown. Schematic diagram 200A illustrates an arrangement of a pen tip of untethered active pen 101 within the component blocks for untethered active pen 101 of FIG. 1A. In one embodiment, untethered active pen 101 also includes a conductive tip (e.g., pen tip 202) and a shield 204. In one embodiment, untethered active pen 101 has an approximately cylindrical body. However, such an approximately cylindrical body as shown in FIG. 2A is not meant to be limiting, as other body shapes for untethered active pen 101 are within the spirit and scope of embodiments of the present invention.

As shown in FIG. 2A, shield 204 coincides with the outer envelope of the cylindrical body of untethered active pen 101. However, this is illustrated by way of example and not limitation, as shield 204 may be within the outer envelope of the cylindrical body of untethered active pen 101. In addition, in another embodiment, the conductive tip (e.g., pen tip 202) may have, without limitation thereto, an approximately conical shape located in a distal end of the cylindrical body of untethered active pen 101. Furthermore, in another embodiment of the present invention, the conductive tip (e.g., pen tip 202) may be provided with an insulator layer disposed on the outer surface of the conductive tip that interacts with the capacitive sensing device 102.

As shown in FIG. 2A, in one embodiment, capacitive sensing device 102 includes a touchpad 208. However, this is illustrated by way of example and not limitation as capacitive sensing device 102 may include alternative component parts, such as, for example, a touchscreen. Consider an embodiment where capacitive receiving unit 110 is configured to receive the capacitive sensing signal from capacitive sensing device 102. In one such embodiment, capacitive receiving unit 110 includes a conductive tip (e.g., pen tip 202), which serves to capacitively couple other components of capacitive receiving unit 110 through coupling capacitance 104 to capacitive sensing device 102, for example, through touchpad 208.

Consider another embodiment where transmitter unit 140 is configured to transmit the amplified active pen signal to capacitive sensing device 102. In one such embodiment, transmitter unit 140 includes shield 204 and the conductive tip (e.g., pen tip 202), which serves to capacitively couple other components of transmitter unit 140 through coupling capacitance 104 to capacitive sensing device 102, for example, through touchpad 208. In one embodiment, the amplified active pen signal may have, by way of example without limitation thereto, the form of a square-wave waveform with a second frequency and second phase to emulate the signal produced by a user's finger in interacting with capacitive sensing device 102. Alternatively, in other embodiments of the present invention, other waveforms may be used for the amplified active pen signal, such as a sinusoidal waveform.

Although the conductive tip (e.g., pen tip 202) is shown as the principle receiving and transmitting component of untethered active pen 101, this is illustrated by way of example and not limitation, as other embodiments of the present invention are not so limited. As described above, capacitance 106 between capacitive sensing device 102 and earth ground, and external impedance 108, shown by way of example without limitation thereto as a capacitance, between untethered active pen 101 and earth ground close the AC circuit through which the amplified active pen signal propagates.

With reference now to FIG. 2B, in accordance with an embodiment of the present invention, a circuit diagram 200B is shown. Circuit diagram 200B illustrates one example arrangement of electronic components within the component blocks for untethered active pen 101 of FIG. 1A. As illustrated in FIG. 2B, in one embodiment, capacitive receiving unit 110 of untethered active pen 101 includes a conductive tip, for example, pen tip 202, coupled to capacitive receiving unit 110. In one embodiment, pen tip 202 capacitively couples untethered active pen 101 with capacitive sensing device 102 through the coupling capacitance $C_{PENTIP}$ 104 of pen tip 202. As used herein, the coupling capacitance $C_{PENTIP}$ 104 of pen tip 202 is to be understood as the coupling capacitance between pen tip 202 and capacitive sensing device 102.

As illustrated in FIG. 2B, in one embodiment, capacitive sensing device 102 also includes a touchpad 208, which for embodiments of the present invention, couples with the conductive tip, which is provided by the pen tip 202. In one embodiment, pen tip 202 of untethered active pen 101 receives the capacitive sensing signal and also transmits the amplified active pen signal.

In one embodiment, capacitive receiving unit 110 includes a coupling resistor, R1 (denoted as 212 in FIG. 2B). In one embodiment, the value of coupling resistor R1 is approximately 100 kOhms (kΩ). In one embodiment, coupling resistor R1 is mainly for electrostatic discharge (ESD) protection.

As illustrated in FIG. 2B, in one embodiment, capacitive receiving unit 110 also includes a buffer amplifier U1 (denoted as op-amp 218 in FIG. 2B), a bias resistor R2 (denoted as 214 in FIG. 2B), and a parasitic input capacitance C2 (denoted as 216 in FIG. 2B) of buffer amplifier U1. A suitable op-amp for buffer amplifier U1 of capacitive receiving unit 110 is a Texas Instruments OPA 348.

Bias resistor R2 forms a high-pass filter (HPF) with coupling capacitance $C_{PENTIP}$ 104 of pen tip 202, which dominates, and parasitic input capacitance C2 of the buffer amplifier U1. Bias resistor R2 and parasitic input capacitance C2 form a low frequency pole at ½πR2C2. Frequencies below the frequency ½πR2C2 are attenuated. Frequencies above the frequency ½πR2C2 have an amplitude $C_{PENTIP}$/C2. Thus, it is desirable to keep parasitic input capacitance C2 small in order to provide a large signal to the input of buffer amplifier U1.

In one embodiment, given a pole at 30 kHz and a practical upper limit on the value of bias resistor R2 of about equal to 10 MOhms (MΩ), parasitic input capacitance C2 is at least 0.5 picofarads (pF). In another embodiment, with a practical upper limit on the value of bias resistor R2 of about equal to 10 MΩ, and parasitic input capacitance C2 about equal to 6 picofarads (pF), a pole can be created at 2.7 kHz. Bias resistor R2 and parasitic input capacitance C2 along with pen tip 202 form a high-pass filter. Capacitive receiving unit 110, in combination with pen tip 202, provides an input stage for untethered active pen 101. This input stage serves to buffer and filter the capacitive sensing signal for the signal processing unit 120, which is next described, by providing a large measurement signal and filtering out power supply line noise.

With further reference to FIG. 2B, in accordance with an embodiment of the present invention, signal processing unit 120 includes an bandpass filter U2 (denoted as 222 in FIG. 2B), a driving comparator U3 (denoted as comparator 224 in FIG. 2B) and logic and control circuitry 228. A suitable op-amp for bandpass filter U2 of signal processing unit 120 is a Texas Instruments OPA 348. Bandpass filter U2 amplifies and filters the capacitive sensing signal for input to a driving comparator U3. Thus, bandpass filter U2 serves as a bandpass filter and gain stage which further filters out power line noise and high frequency interferers. Driving comparator U3 serves as a comparator referenced to the pen ground, which captures the zero-crossings of the capacitive sensing signal. A suitable comparator for driving comparator U3 of the signal processing unit 120 is a National Semiconductor Corporation LMV7271. Driving comparator U3 provides input to logic and control circuitry 228. A suitable microcontroller for logic and control circuitry 228 of signal processing unit 120 is a Texas Instruments MSP430F2012. In one embodiment, signal processing unit 120 further includes signal strength measurement circuitry coupled to the output of bandpass filter U2. The signal strength measurement circuitry includes a diode D1 (denoted as 225 in FIG. 2B) coupled to system ground through both a capacitor C3 (denoted as 227 in FIG. 2B) and a resistor R3 (denoted as 226 in FIG. 2B). The signal strength measurement circuitry is coupled to logic and control circuitry 228 by means of an analog to digital converter (ADC) 229. The input to ADC 229 couples to the signal strength measurement circuitry at the node common to resistor R3, capacitor C3 and diode D1. The output from ADC 229 couples to an input to the logic and control circuitry 228.

With further reference to FIG. 2B, in accordance with one embodiment of the present invention, logic and control circuitry 228 enables a capacitive sensing signal frequency detector to determine a first frequency. In one embodiment of the present invention, logic and control circuitry 228 may be configured to provide that transmitter unit 140 transmits at the second frequency corresponding to the first frequency. This causes transmitter unit 140 to transmit the amplified active pen signal at the second frequency. In another embodiment of the present invention, logic and control circuitry 228 may be configured to provide that transmitter unit 140 transmits at the second frequency corresponding to the first frequency and at a determined average power corresponding to the first signal strength. This causes transmitter unit 140 to transmit the amplified active pen signal at the second frequency and an average power. Transmitting the amplified active pen signal at an average power can include, but is not limited to, transmitting the active pen signal at a known amplitude with a determined number of cycles corresponding to the first signal strength or transmitting the active pen signal at an amplitude corresponding to the first signal strength. In one embodiment, when the signal strength of the first signal is determined to be high, the active pen signal is transmitted at a higher number of cycles, and when the signal strength of the first signal is determined to be low, the active pen signal is transmitted at a lower number of cycles. In other words, the number of cycles transmitted is proportional to the strength of the first signal.

Alternatively, in another embodiment of the present invention, logic and control circuitry 228 enables a capacitive sensing signal frequency detector to determine whether the first frequency lies within a selected range of frequencies. In accordance with an embodiment, the first frequency may lie in a range bracketing either side of a central frequency by a percentage of the central frequency. For example, in one embodiment, a central frequency equal to about 50 kiloHertz (kHz) may be bracketed on either side by a range of about 30 percent, from about 65 kHz to 38.5 kHz. Provided that the first frequency lies within the selected range of frequencies, logic and control circuitry 228 may be configured to provide that the transmitter unit 140 transmits at the second frequency corresponding to the first frequency. This causes transmitter unit 140 to transmit the amplified active pen signal at the second frequency.

In one embodiment of the present invention, logic and control circuitry 228 sets the second phase of the amplified active pen signal with a delay relative to the first signal. In this manner, the delay causes the amplified active pen signal to appear with the correct phase relationship to the capacitive sensing signal for recognition by capacitive sensing device 102. In one embodiment, the delay is determined by the impedances of the preceding stages of untethered active pen 101.

Embodiments of the present invention that may be used to determine a first frequency and a first phase of the capacitive sensing signal also include signal measuring techniques that may include, without limitation thereto, a phase locked loop (PLL), or alternatively, a modulator and low-pass filter (LPF) or a Fast Fourier Transform (FFT). Furthermore, in another embodiment, logic and control circuitry 228 is provided with a lookup table. In one embodiment, the lookup table allows logic and control circuitry 228 to determine the second phase corresponding to the delay associated with the first frequency. In one embodiment, the lookup table allows logic and control circuitry 228 to determine the effect of the first frequency on the impedances of the preceding stages of untethered active pen 101.

With further reference to FIG. 2B, in accordance with one embodiment of the present invention, logic and control circuitry 228 measures the frequency of the capacitance sensing signal and plays back an interfering signal as the amplified active pen signal. This interfering signal is at either a fundamental frequency about equal to the first frequency in bursts, or alternatively, continuously, at some higher harmonic of the first frequency. In another embodiment of the present invention, if a lower harmonic than the fundamental frequency is used for the active pen signal, the lower harmonic may be transmitted so that active pen signal does not include higher harmonics of the received signal.

In one embodiment, logic and control circuitry 228 enables signal processing unit 120 to determine the first frequency and the first phase of the capacitive sensing signal from capacitive sensing device 102. This determining can be done concurrently with transmitting of the amplified active pen signal, for example, at some higher harmonic of the first frequency. In another embodiment, signal processing unit 120 further includes a higher harmonic frequency filter (not shown). In one embodiment of the present invention, the higher harmonic frequency filter filters higher harmonic frequencies such that signal processing of the capacitive sensing signal, by the signal processing unit 120, is not substantially influenced by the transmitting of the amplified active pen signal. As used herein, "substantially" in the phrase, " . . . signal processing of the capacitive sensing signal, by the signal processing unit 120, is not substantially influenced by the transmitting of the amplified active pen signal," means that the amplified active pen signal does not significantly interfere with the signal processing of the capacitive sensing signal. Alternatively, in one embodiment, logic and control circuitry 228 enables signal processing unit 120 to determine the first frequency and the first phase of the capacitive sensing signal from capacitive sensing device 102 concurrently with transmitting of the amplified active pen signal at some harmonic of the first frequency. Alternatively, in another embodiment, logic and control circuitry 228 enables signal processing unit 120 to determine the first frequency and the first phase and the first signal strength of the capacitive sensing signal from capacitive sensing device 102 concurrently with transmitting of the amplified active pen signal at some sub-harmonic of the first frequency that does not interfere with the signal processor.

In addition, in another embodiment, logic and control circuitry 228 acts to modulate the amplified active pen signal to simulate how one or more fingers of a user would interact with capacitive sensing device 102. For example, in one embodiment, the gestures that a user's finger could perform, which the amplified active pen signal might simulate, may include: a singe tap, a double tap, a tap and hold, and a drag and drop. In one embodiment, the ability of the amplified active pen signal to simulate such gestures can substitute for removing the pen to perform such a gesture with one or more of the user's fingers.

In another embodiment, logic and control circuitry 228 enables the signal processing unit 120 to suspend determining the first frequency and the first phase of the capacitive sensing signal from capacitive sensing device 102 while untethered active pen 101 transmits the amplified active pen signal. Thus, logic and control circuitry 228 drives amplifier 130, which is next described, with the active pen signal so that the amplified active pen signal has second frequency and second phase, which correspond, respectively, to the first frequency and the first phase of the capacitive sensing signal.

With further reference to FIG. 2B, in accordance with an embodiment of the present invention, amplifier 130 includes a step-up transformer, T1 (denoted as 232 in FIG. 2B). A suitable step-up transformer for amplifying the active pen signal is a Tamura MET-01. In one embodiment, step-up transformer T1 is configured to provide a 28:1 voltage gain for the amplified active pen signal relative to the active pen signal input from logic and control circuitry 228. Alternatively, in another embodiment, a switched inductive boost may be used instead of step-up transformer T1. This would avoid the bulk and expense associated with use of step-up transformer T1.

In one embodiment of the present invention, step-up transformer T1 drives shield 204 with the amplified active pen signal. In another embodiment of the present invention, step-up transformer T1 also generates an inverted signal (anti-signal) that may act like a "negative finger," which appears on the anti-signal layer that shields untethered active pen 101. Moreover, in another embodiment, a guard layer 264 may also be provided. In an embodiment of the present invention, by the correct physical placement of the pen tip 202, guard layer 264, anti-signal layer 268, and shield 204, it is possible to reduce the effects of pen tilt and parallax. The step-up transformer T1 drives transmitter unit 140, which is next described, with the amplified pen signal.

With further reference to FIG. 2B, in accordance with an embodiment of the present invention, transmitter unit 140 includes at least external shield 204 of untethered active pen 101. Transmitter unit 140 may also further include a conductive tip (e.g., pen tip 202). Pen tip 202 may be considered to facilitate the transmission of the amplified active pen signal to capacitive sensing device 102, without limitation thereto.

In an embodiment, the amplified active pen signal from step-up transformer T1 drives shield 204. Shield 204 may be capacitively coupled to a user through a capacitance that is part of the external impedance $Z_{EXT}$ 108, or alternatively may be ohmically coupled to the user through a resistance that is part of the external impedance $Z_{EXT}$ 108. Moreover, the user may be capacitively coupled to earth ground through a capacitance that is part of the external impedance $Z_{EXT}$ 108, or alternatively resistively coupled to earth ground through a resistance that is part of the external impedance $Z_{EXT}$ 108. The external impedance $Z_{EXT}$ 108 may also include resistive, inductive and capacitive contributions from other external entities in the signal path of the amplified active pen signal. This causes the electronics of untethered active pen 101, including pen tip 202, to bounce up and down with an AC component of the amplified active pen signal relative to a user holding untethered active pen 101 and/or relative to capacitive sending device 102. Thus, the AC component of the amplified active pen signal may propagate through the AC circuit closed by capacitance $C_{LAPTOP}$ 106 between capacitive sensing device 102 and earth ground, and the coupling capacitance $C_{PENTIP}$ 104 of pen tip 202.

Consequently, pen tip 202 has an increased signal that is provided by the amplified active pen signal. This increased signal may be detected by the capacitive touchpad 208 of capacitive sensing device 102. Capacitance $C_{LAPTOP}$ 106 and external impedance $Z_{EXT}$ 108 are assumed to be much larger than $C_{PENTIP}$. Consequently, capacitance $C_{LAPTOP}$ 106 and external impedance $Z_{EXT}$ 108 do not change the amplified active pen signal. Capacitance $C_{BODY}$ 270 represents the parasitic capacitance between the electronics of untethered active pen 101 and body of untethered active pen 101. Capacitance $C_{BODY}$ 270, which must be charged to the drive voltage and discharged, may be the cause of significant power draw from a power supply.

Although capacitance $C_{LAPTOP}$ 106 is designated as the coupling capacitance of a laptop computer with earth ground, this is by way of example and not limitation, as capacitive sensing device 102 can be incorporated in other environments than that of a laptop computer. Some non-limiting examples of such other environments include: a cellular phone, an audio recording device, or a computer monitor, without limitation thereto. Thus, in such alternative environments, capacitance 106 is the capacitance between earth ground and such an apparatus that serves as another environment. Therefore, the embodiments of the present invention described above for capacitance $C_{LAPTOP}$ 106 apply as well in these alternative environments. As such, it is understood that capacitance 106 is the capacitance between earth ground and such an apparatus that serves as another environment.

With further reference to FIG. 2B, in accordance with an embodiment of the present invention, untethered active pen 101 includes a power supply coupled to at least capacitive receiving unit 110. In an embodiment, the power supply may include a first AAA battery 252 and a second AAA battery 254, without limitation thereto, which run from about 1.6 volts (V) to 3.0 V. For convenience, in one embodiment, the batteries provide split power. Alternatively, in another embodiment, a resistive divider may be provided with a single battery, which may be configured to provide a virtual ground. Thus, battery 252 and battery 254 may be replaced with a single lithium battery. Alternatively, in another embodiment, boosting a single AAA battery may provide 3.0 V using a boost converter such as the Texas Instruments TPS61005, or TPS60313.

In addition, in one embodiment, untethered active pen 101 may include a recharging unit (not shown) coupled to power supply. The recharging unit receives power from a charging source (not shown) provided that untethered active pen 101 is placed in proximity with the charging source. The recharging unit may be configured to recharge a power source within power supply. In one embodiment, the recharging unit may include an "ink well," a figurative term that refers to a recharging unit for receiving untethered active pen 101 in a parking receptacle, analogous to an ink well used to fill a fountain pen. In another embodiment, the recharging unit may include a "shake generator;" the shake generator includes a magnet that is surrounded by a metal coil which "induces" a small amount of voltage in the coil when the shake generator is shaken. A re-chargeable battery may be used to store the energy of the shake generator so that the rechargeable battery may be used to power the untethered active pen 101. Alternatively, in another embodiment of the present invention, a super-cap may be used to store the energy of the shake generator so that the super-cap may be used to power the untethered active pen 101.

In another embodiment, the signal processing unit 120 of the untethered active pen 101 may also include a pen switch (not shown) coupled to logic and control circuitry block 120C. The logic and control circuitry block 120C activates untethered active pen 101 in response to a signal received from the pen switch when untethered active pen 101 couples with capacitive sensing device 102. In another embodiment, the pen switch may include a tip switch, or alternatively, a switch located outside of the tip. In another embodiment of the present invention, the pen switch may be configured within other component blocks of the untethered active pen 101, as such embodiments are within the spirit and scope of embodiments of the present invention. For example, the pen switch may be configured as part of the capacitive receiving unit 110, the amplifier 130, the transmitter unit 140 or the power supply so that in response to a signal received from the pen switch when the untethered active pen 101 couples with the capacitive sensing device 102 the untethered active pen 101 is activated. Any of a variety of mechanical or electronic switches that may be employed for the pen switch is within the spirit and scope of embodiments of the present invention. Moreover, in one embodiment, untethered active pen 101 may be activated based on sensing of capacitive coupling associated with the capacitive sensing signal, or alternatively the power of the capacitive sensing signal reaching a threshold value, as might occur when untethered active pen 101 is brought into proximity of capacitive sensing device 102. In addition, in another embodiment of the present invention, when the capacitive sensing signal is lost, untethered active pen 101 may enter a sleep mode, or alternatively, power down.

Figure 3:
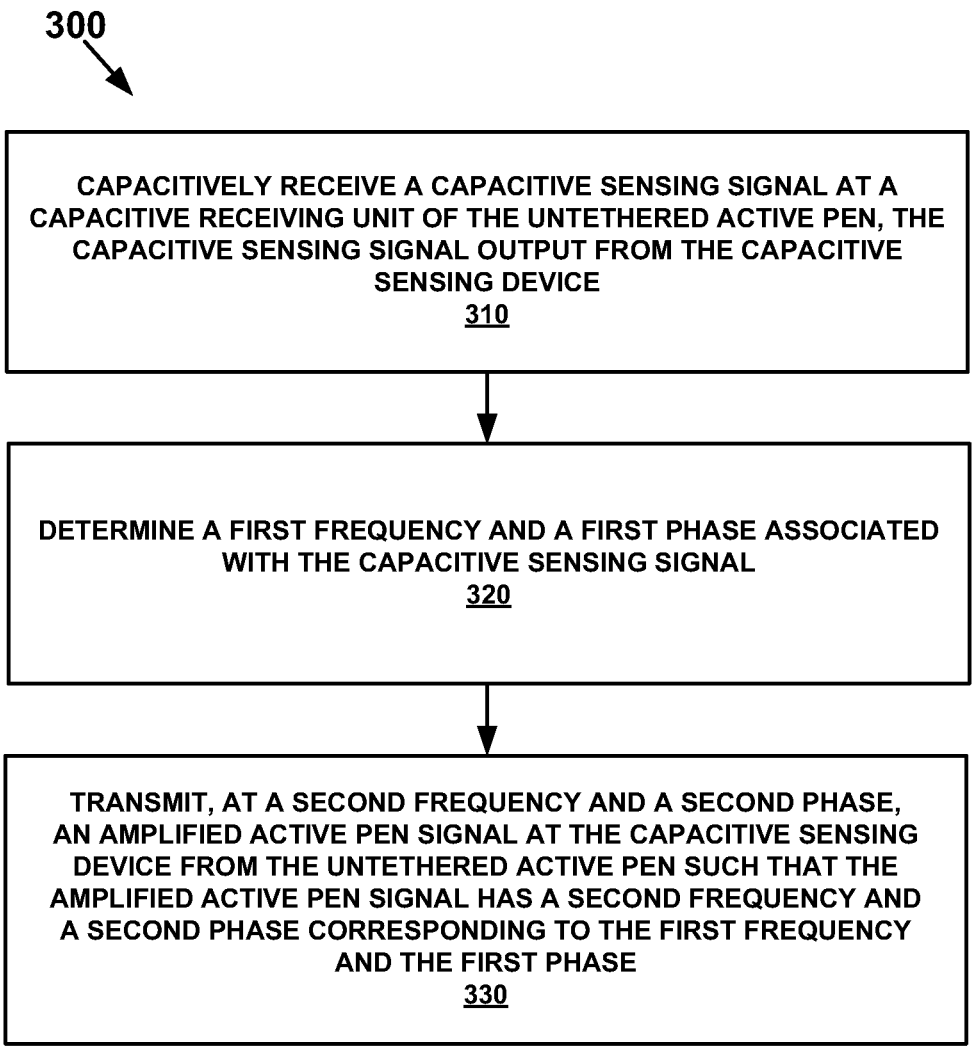
FIG. 3 is a flow chart illustrating a method for communicating with the capacitive sensing device using the untethered active pen of FIG. 1A, in an embodiment of the present invention.

Example Method for Communicating With a Capacitive Sensing Device Using an Untethered Active Pen With reference now to FIG. 3, in accordance with an embodiment of the present invention, a flow chart 300 is shown. Flow chart 300 illustrates a method for communicating with the capacitive sensing device using the untethered active pen of FIGS. 1A through 2B.

At 310, a capacitive sensing signal that is output from the capacitive sensing device is capacitively received at a capacitive receiving unit of the untethered active pen.

At 320, a first frequency and a first phase that are associated with the capacitive sensing signal are determined. In one embodiment, the determining of the first frequency and the first phase are suspended while the amplified active pen signal is transmitted from the untethered active pen. In another embodiment, the first frequency and the first phase are determined concurrently with transmission of the amplified active pen signal from the untethered active pen. In another embodiment, a first signal strength can be determined in addition to the first frequency and the first phase. In one embodiment of such concurrent determining and transmission, the amplified pen signal includes a second frequency and the second phase such that the second frequency is at a higher harmonic frequency of the first frequency. In one embodiment of such concurrent determining and transmission, the amplified pen signal includes a second frequency and the second phase such that the second frequency is at a sub-harmonic frequency of the first frequency. In one embodiment of the present invention, the amplified pen signal is transmitted at an average power. In addition, in one embodiment of the present invention, it may also be determined whether the first frequency lies within a selected range of frequencies, without limitation thereto.

At 330, in one embodiment, an amplified active pen signal at a second frequency and a second phase is transmitted at the capacitive sensing device from the untethered active pen. The second frequency and the second phase of the amplified active pen signal correspond to the first frequency and the first phase of the capacitive sensing signal, respectively. In another embodiment, an amplified active pen signal at a second frequency and a second phase is transmitted at the capacitive sensing device at an average power from the untethered active pen. The second frequency, the second phase and the average power of the amplified active pen signal correspond to the first frequency, the first phase and the first signal strength of the capacitive sensing signal, respectively. Provided that the first frequency lies within the selected range of frequencies, transmitting the amplified active pen signal includes transmitting the amplified active pen signal at the second frequency. Alternatively, in another embodiment, transmitting the amplified active pen signal at the second frequency may proceed without determination of whether the first frequency lies within the selected range of frequencies, as described above. In accordance with an embodiment, the method for communicating with the capacitive sensing device using the untethered active pen may further include filtering the capacitive sensing signal such that signal processing of the capacitive sensing signal is not substantially influenced by the transmitting of the amplified active pen signal at the second frequency.

In accordance with an embodiment of the present invention, the method for communicating with the capacitive sensing device using the untethered active pen may further include activating the untethered active pen when a switch of the untethered active pen engages the capacitive sensing device. In one embodiment, the pen switch may include a tip switch, or alternatively, a switch located outside of the tip. Moreover, in another embodiment, the untethered active pen may be activated based on sensing of capacitive coupling associated with the capacitive sensing signal, or alternatively the power of the capacitive sensing signal reaching a threshold value, as might occur when the untethered active pen is brought into proximity with the capacitive sensing device. In addition, in one embodiment, when the capacitive sensing signal is lost the untethered active pen may enter a sleep mode, or alternatively, power down. In another embodiment, the method for communicating with the capacitive sensing device using the untethered active pen may further include modulating the amplified active pen signal to simulate how one or more fingers of a user would interact with a capacitive sensing device. For example, in one embodiment, the gestures that a user's finger could perform, which the amplified active pen signal might simulate, may include: a single tap, double tap, tap and hold, and a drag and drop, as described above. In one embodiment of the present invention, the ability of the amplified active pen signal to simulate such gestures might substitute for removing the pen to perform such a gesture with one or more of the user's fingers, as described above.

Example Alternative Embodiments

Figure 4:
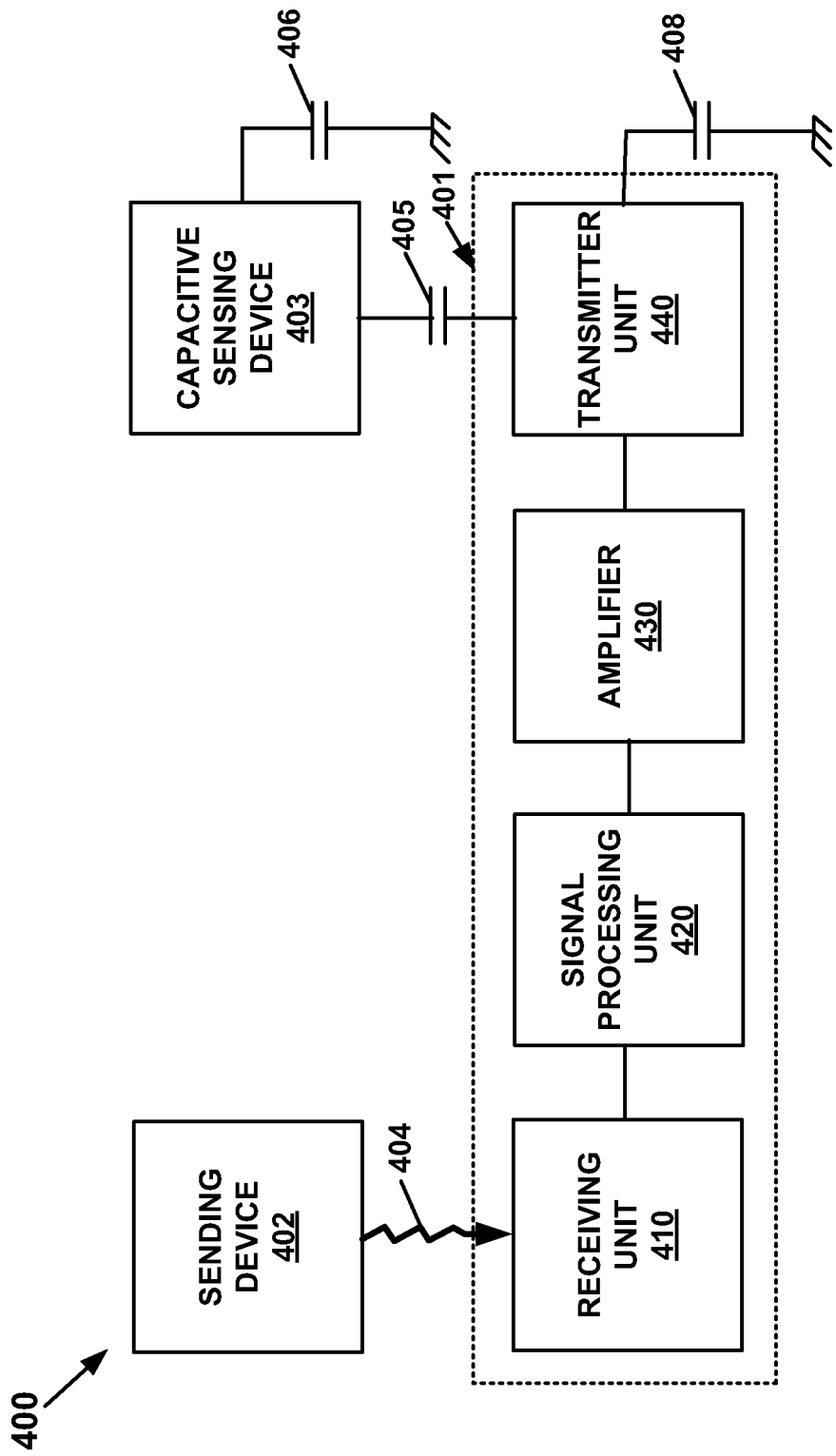
FIG. 4 is a block diagram of an alternative embodiment illustrating component blocks for the untethered active pen for communicating with the capacitive sensing device, in an embodiment of the present invention.

With reference now to FIG. 4, in accordance with an embodiment of the present invention, a block diagram 400 of an alternative embodiment of the present invention is shown. Block diagram 400 illustrates the arrangement of component blocks of an untethered active pen 401 for communicating with a capacitive sensing device 403, in an alternative embodiment of the present invention Untethered active pen 401 includes a receiving unit 410 that receives a first signal 404 from a sending device 402. FIG. 4 illustrates an alternative embodiment of the present invention in which a sending device 402 other than capacitive sensing device 102 of FIGS. 1A, 2A and 2B is used by untethered active pen 401 for receiving first signal 404. Untethered active pen 401 is similar to the untethered active pen 101, described above in the discussions of FIGS. 1A, 1B, 2A, 2B and 3, except that untethered active pen 401 receives first signal 404 from sending device 402. Therefore, embodiments of the present invention described above in the discussions of FIGS. 1A, 1B, 2A, 2B and 3 that are applicable to untethered active pen 401 are incorporated herein.

With further reference to FIG. 4, in accordance with an embodiment of the present invention, sending device 402 may be, for example, an IR LED, or alternatively an inductive sending device, without limitation thereto. In one embodiment, a specially designed capacitive sensing device 403 is used to send first signal 404 to untethered active pen 401, thus indicating what to broadcast as an amplified active pen signal. For example, in one embodiment, capacitive sensing device 403 drives a sending device 402 such as, for example, an IR LED, which indicates to untethered active pen 401 what to broadcast. Alternatively, in another embodiment, a sending device 402, such as, for example, an inductive sending device provided by an inductive loop of capacitive sensing device 403, and an inductive pickup on untethered active pen 401 provide similar functionality. Furthermore, by using a resonant inductor loop for sending device 402 and resonant pickup on untethered active pen 401, the signaling could be done with greater efficiency.

Alternatively, in another embodiment, a high-frequency capacitive signal is sent to untethered active pen 401 telling it when to broadcast. In another embodiment, the non-capacitive source (e.g., sending device 402) transmits information related to the capacitive sensing signal. For example, in one embodiment, the non-capacitive source transmits the first frequency and first phase of the capacitive sensing signal, instead of just the capacitive sensing signal. In an embodiment of the present invention, untethered active pen 401 is configured to receive this information and decode the signal to determine the first frequency and first phase of the capacitive sensing signal. In another embodiment, untethered active pen 401 transmits at a second frequency and second phase related to the decoded first frequency and first phase of the capacitive sensing signal. In another embodiment, the first frequency and first phase of the capacitive sensing signal are encoded within the non-capacitive transmitted signal (e.g., first signal 404) from sending device 402. Thus, sending device 402 might be configured to send a first signal 404 either encoded with information with respect to the capacitive sensing signal, or alternatively, a non-capacitive analog of the capacitive sensing signal, itself. These techniques may be more robust against noise because the excitation signal, for example, first signal 404, is being sent on a separate channel that does not interfere with capacitive sensing device 403.

With further reference to FIG. 4, in accordance with an embodiment of the present invention, untethered active pen 401 also includes a signal processing unit 420. In one embodiment, signal processing unit 420 determines (from first signal 404) a first frequency and a first phase that are associated with a capacitive sensing signal of capacitive sensing device 403. In one embodiment, signal processing unit 420 generates an active pen signal corresponding to the first frequency and the first phase. In one embodiment, signal processing unit 420 further determines a second frequency and a second phase corresponding to the first frequency and the first phase. In another embodiment, untethered active pen 401 also includes an amplifier 430 that amplifies the active pen signal generated by the signal processing unit 420. In this manner amplifier 430 produces an amplified active pen signal. In addition, in one embodiment, untethered active pen 401 includes a transmitter unit 440 that transmits the amplified active pen signal at capacitive sensing device 402 from untethered active pen 401. A capacitance 406 between capacitive sensing device 403 and earth ground, and an external impedance 408, shown by way of example without limitation thereto as a capacitance, between untethered active pen 401 and earth ground provide a closed AC circuit. In this closed AC circuit, untethered active pen 401, a capacitance 405 of a pen tip, and capacitive sensing device 402 are coupled in series. Through this closed AC circuit, the amplified active pen signal is transmitted to capacitive sensing device 403 through the capacitance 405 of the conductive tip. The pen tip is similar to pen tip 202, as previously described. In one embodiment, the second frequency and the second phase of the amplified active pen signal correspond to the first frequency and the first phase of the capacitive sensing signal, respectively.

Figure 5:
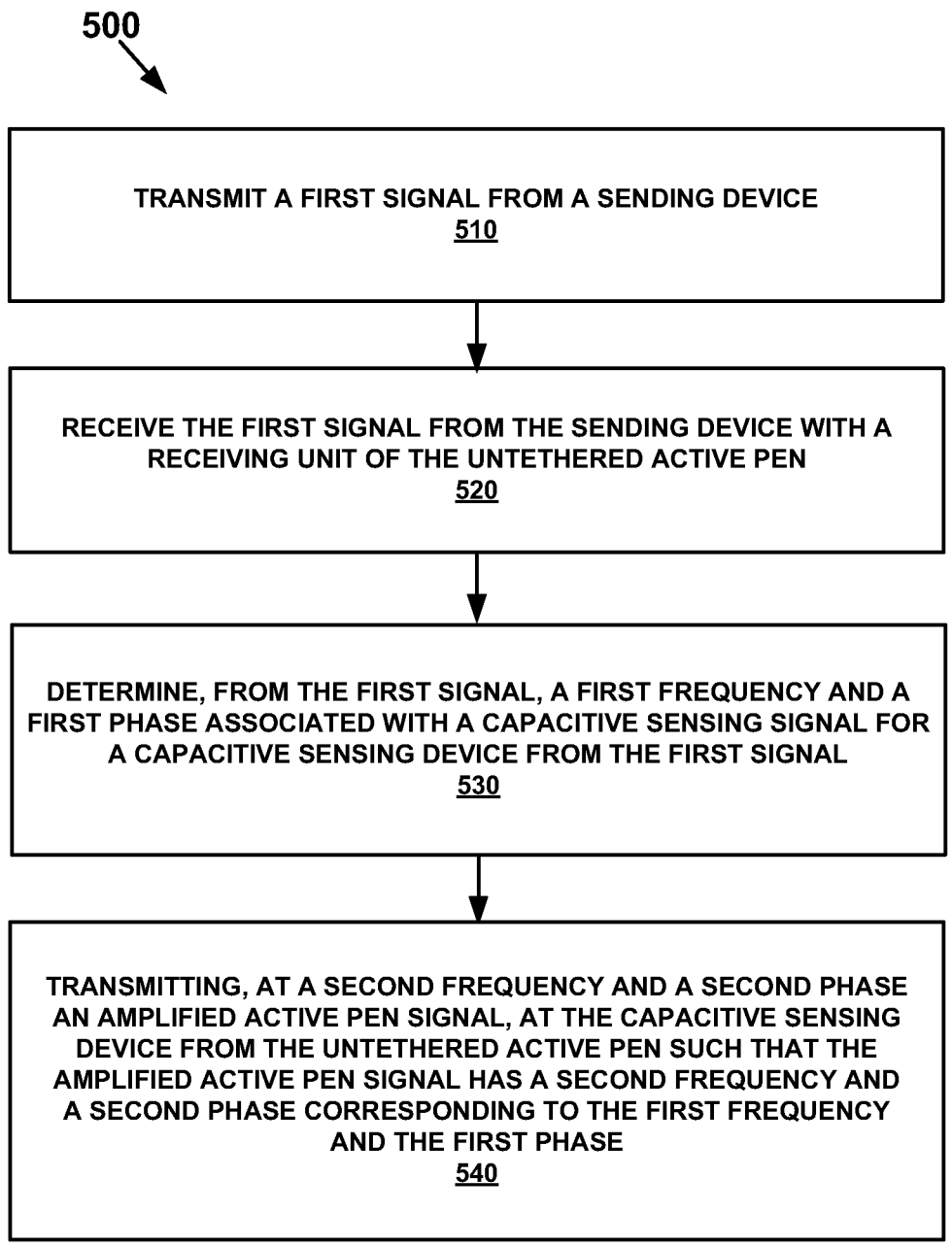
FIG. 5 is a flow chart of an alternative embodiment illustrating a method for communicating with the capacitive sensing device using the untethered active pen of FIG. 4, in an embodiment of the present invention.

With reference now to FIG. 5, in accordance with alternative embodiment of the present invention, a flow chart 500 of an alternative embodiment of the present invention is shown. Flow chart 500 illustrates a method for communicating with a capacitive sensing device using untethered active pen of FIG. 4.

At 510, a first signal is transmitted from a sending device.

At 520, the first signal that is transmitted from the sending device is received at a receiving unit of the untethered active pen. The first signal received from the sending device may be a non-capacitive first signal.

At 530, a first frequency and a first phase that are associated with a capacitive sensing signal for the capacitive sensing device are determined from the first signal.

At 540, an amplified active pen signal, at a second frequency and a second phase, is transmitted at the capacitive sensing device from the untethered active pen. In one embodiment, the second frequency and the second phase of the amplified active pen signal correspond to the first frequency and the first phase of the capacitive sensing signal, respectively.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for communicating with a capacitive sensing device using an untethered active pen comprising:
    capacitively receiving a capacitive sensing signal at a capacitive receiving unit of said untethered active pen, said capacitive sensing signal output from said capacitive sensing device;
    determining a first frequency and a first phase associated with said capacitive sensing signal; and
    transmitting at a second frequency and a second phase an amplified active pen signal at said capacitive sensing device from said untethered active pen, said amplified active pen signal having said second frequency and said second phase corresponding to said first frequency and said first phase, said amplified pen signal being a harmonic of said capacitive sensing signal.

2. The method recited in claim 1, wherein said determining said first frequency and said first phase associated with said capacitive sensing signal comprises:
    suspending said determining said first frequency and said first phase while transmitting said amplified active pen signal from said untethered active pen.

3. The method recited in claim 1, wherein said determining said first frequency and said first phase associated with said capacitive sensing signal comprises:
    said determining said first frequency and said first phase concurrently with said transmitting of said amplified active pen signal from said untethered active pen at said second frequency and said second phase, said second frequency being a higher harmonic frequency of said first frequency.

4. The method recited in claim 3, said method further comprising:
filtering said capacitive sensing signal such that signal processing of said capacitive sensing signal is not substantially influenced by said transmitting of said amplified active pen signal at said second frequency.

5. The method recited in claim 1, wherein said determining said first frequency and said first phase associated with said capacitive sensing signal comprises:
said determining said first frequency and said first phase concurrently with transmitting of said amplified active pen signal from said untethered active pen at said second frequency and second phase, said second frequency being a sub-harmonic frequency of said first frequency.

6. The method recited in claim 1, wherein said determining comprises determining whether said first frequency lies within a selected range of frequencies.

7. The method recited in claim 6, wherein said transmitting comprises transmitting said amplified active pen signal at said second frequency, provided said first frequency lies within said selected range of frequencies.

8. The method recited in claim 1, said method further comprising:
activating said untethered active pen when a switch of said untethered activated pen engages said capacitive sensing device.

9. The method recited in claim 1, said method further comprising:
modulating said amplified active pen signal to simulate how one or more fingers of a user would interact with a capacitive sensing device.

10. The method recited in claim 1, said method further comprising:
determining a first signal strength associated with said capacitive sensing signal; and
transmitting said amplified active pen signal with an average power corresponding to said first signal strength.

11. An untethered active pen comprising:
a capacitive receiving unit configured to capacitively receive a capacitive sensing signal from a capacitive sensing device;
a signal processing unit configured to determine a first frequency and a first phase associated with said capacitive sensing signal and to generate an active pen signal corresponding to said first frequency and said first phase, said signal processing unit further configured to determine a second frequency and a second phase corresponding to said first frequency and said first phase;
an amplifier configured to amplify said active pen signal generated by said signal processing unit to produce an amplified active pen signal; and
a transmitter unit configured to transmit said amplified active pen signal at said capacitive sensing device from said untethered active pen, wherein said amplified active pen signal has said second frequency and said second phase corresponding to said first frequency and said first phase, said amplified pen signal being a harmonic of said capacitive sensing signal.

12. The untethered active pen of claim 11, further comprising:
a conductive tip coupled to said capacitive receiving unit, said conductive tip configured to capacitively couple said untethered active pen with said capacitive sensing device.

13. The untethered active pen of claim 12, wherein said conductive tip of said untethered active pen is configured to both receive said capacitive sensing signal and to transmit said amplified active pen signal.

14. The untethered active pen of claim 11, wherein said signal processing unit is configured to suspend said determining said first frequency and said first phase of said capacitive sensing signal from said capacitive sensing device while said untethered active pen transmits said amplified active pen signal.

15. The untethered active pen of claim 11, wherein said signal processing unit is configured to perform said determining said first frequency and said first phase of said capacitive sensing signal from said capacitive sensing device concurrently with transmitting of said amplified active pen signal.

16. The untethered active pen of claim 15, wherein said signal processing unit further comprises:
a higher harmonic frequency filter, said higher harmonic frequency filter configured to filter higher harmonic frequencies such that signal processing of said capacitive sensing signal, by said signal processing unit, is not substantially influenced by said transmitting of said amplified active pen signal.

17. The untethered active pen of claim 11, wherein said signal processing unit further comprises:
logic and control circuitry, said logic and control circuitry configured to enable a capacitive sensing signal frequency detector to determine whether said first frequency lies within a selected range of frequencies, and provided said first frequency lies within said selected range of frequencies, said logic and control circuitry configured to provide that said transmitter unit transmits at said second frequency corresponding to said first frequency and to enable said transmitter unit to transmit said amplified active pen signal.

18. The untethered active pen of claim 17, wherein said signal processing unit further comprises:
a pen switch, said pen switch coupled to said logic and control circuitry, said logic and control circuitry configured to activate said untethered active pen in response to a signal received from said pen switch when said untethered active pen couples with said capacitive sensing device.

19. The untethered active pen of claim 11, further comprising:
a power supply coupled to at least said capacitive receiving unit; and
a recharging unit coupled to said power supply, said recharging unit configured to receive power from a charging source provided said untethered active pen is placed in proximity with said charging source, said recharging unit further configured to recharge a power source within said power supply.

20. A method for communicating with a capacitive sensing device using an untethered active pen comprising:
transmitting a first signal from a sending device;
receiving said first signal from said sending device with a receiving unit of said untethered active pen;
determining, from said first signal, a first frequency and a first phase associated with a capacitive sensing signal for a capacitive sensing device; and transmitting at a second frequency and a second phase an amplified active pen signal at said capacitive sensing device from said untethered active pen, said amplified active pen signal having said second frequency and said second phase corresponding to said first frequency and said first phase, said amplified pen signal being a harmonic of said capacitive sensing signal.

21. The method recited in claim 20, wherein said receiving comprises receiving a non-capacitive first signal from a sending device.

22. An untethered active pen comprising:
- a receiving unit configured to receive a first signal from a sending device;
- a signal processing unit configured to determine a first frequency and a first phase associated with a capacitive sensing signal for a capacitive sensing device from said first signal and to generate an active pen signal corresponding to said first frequency and said first phase, said signal processing unit further configured to determine a second frequency and a second phase corresponding to said first frequency and said first phase;
- an amplifier configured to amplify said active pen signal generated by said signal processing unit to produce an amplified active pen signal; and
- a transmitter unit configured to transmit said amplified active pen signal from said untethered active pen at said capacitive sensing device, wherein said amplified active pen signal has said second frequency and said second phase corresponding to said first frequency and said first phase, said amplified pen signal being a harmonic of said capacitive sensing signal.

* * * * *